(12) United States Patent
Takagi (10) Patent No.: US 6,993,213 B2
(45) Date of Patent: Jan. 31, 2006

(54) SEMICONDUCTOR OPTICAL WAVEGUIDE DEVICE INCLUDING S-SHAPED WAVEGUIDES

(75) Inventor: Kazuhisa Takagi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 98 days.

(21) Appl. No.: 10/713,023

(22) Filed: Nov. 17, 2003

(65) Prior Publication Data

US 2004/0101229 A1    May 27, 2004

(30) Foreign Application Priority Data

Nov. 21, 2002   (JP)   ............................. 2002-337860

(51) Int. Cl.
  *G02B 6/12*   (2006.01)
(52) U.S. Cl. ............................. 385/14; 385/31; 385/39; 385/42; 385/45; 385/47
(58) Field of Classification Search .................. 385/14, 385/31, 32, 39–42, 45, 47, 49, 50
  See application file for complete search history.

(56) References Cited

U.S. PATENT DOCUMENTS

| | | | |
|---|---|---|---|
| 4,790,615 A * | 12/1988 | Seki et al. .................. | 385/129 |
| 6,741,781 B2 * | 5/2004 | Furuyama .................... | 385/129 |
| 2003/0081902 A1 * | 5/2003 | Blauvelt et al. .............. | 385/50 |

FOREIGN PATENT DOCUMENTS

| | | |
|---|---|---|
| JP | 3-256028 | 11/1991 |
| JP | 3256028 | * 11/1991 |

OTHER PUBLICATIONS

Soldano et al. "Optical Multi-Mode Interference Devices Based on Self-Imaging: Principles and Applications". Apr. 1995, pp. 615-267, vol. 13(4), Journal of Lightwave Technology.*
L. Soldano et al., "Optical Multi-Mode Interference Devices Based of Self-Imaging: Principles and Applications," Apr. 1995, pp. 615-627, vol. 13(4), *Journal of Lightwave Technology*.
P.V. Studenkov et al., "Monolithic Integration of an All-Optical Mach-Zehnder Demultiplexer Using an Asymmetric Twin-Waveguide Structure," Jun. 2001, pp. 600-602, vol. 13(6), *IEEE Photonics Technology Letters*.

* cited by examiner

*Primary Examiner*—Frank G. Font
*Assistant Examiner*—Derek L. Dupuis
(74) *Attorney, Agent, or Firm*—Leydig, Voit & Mayer, Ltd.

(57) ABSTRACT

Substantially S-shaped optical waveguides are embedded in a semiconductor substrate, and at least two optical waveguide returning parts are interposed between the input and output ends of the waveguides. Each of the optical waveguide returning parts includes a multiplexing portion. A reflecting part is located on a rear end side of the multiplexing portion of each optical waveguide returning part. Thus, the length between input and output ends of the waveguides can be reduced, suppressing bending loss, and achieving a high speed and small size integrated optical device.

9 Claims, 6 Drawing Sheets

SEMICONDUCTOR OPTICAL WAVEGUIDE DEVICE INCLUDING S-SHAPED WAVEGUIDES

BACKGROUND OF THE INVENTION

1. Field of the Invention

The present invention generally relates to a semiconductor optical waveguide structure for use in a semiconductor optical integrated circuit, and particularly to a semiconductor optical waveguide device that includes bent waveguides integrally formed in a single semiconductor substrate and provided with two or more reflection parts therein.

2. Description of the Related Art

In recent years, optical elements manufactured on a single semiconductor chip to form a monolithic integrated circuit structure are provided, so that a circuit device can be produced in small size, at low cost, with high reliability, and with increased productivity. In order to utilize enormous volumes of transmission data obtained by high-performance information and communication instruments, it is now indispensable to widely spread the use of optical communication networks with optical fibers. A variety of semiconductor optical devices can be constructed using a single substrate type of semiconductor. In the optical communication networks, therefore, semiconductor optical waveguides are widely used as optical transmission waveguides. Such semiconductor optical waveguides can be integrated to achieve a high speed operation with reduction in size. Hereinafter, an assembly of semiconductor optical waveguides having a structure of a combination of different types of semiconductor optical elements integrated in or on a single semiconductor chip substrate is referred to as a "semiconductor optical waveguide device" or simply as a "semiconductor optical device."

In the semiconductor optical device, an optical waveguide having an S-shaped bent portion is generally used to change a light traveling direction as suggested, for example, in a non-patent literature 1 as below.

Non-Patent Literature 1: P. V. Studenkov and other six authors, "Monolithic Integration of an All-Optical Mach-Zehnder Demultiplexer Using an Asymmetric Twin-Waveguide Structure, "IEEE Photonics Technology Letters, Vol. 13, sixth edition, June, 2001, p.600, FIG. 1

Figure 5A:
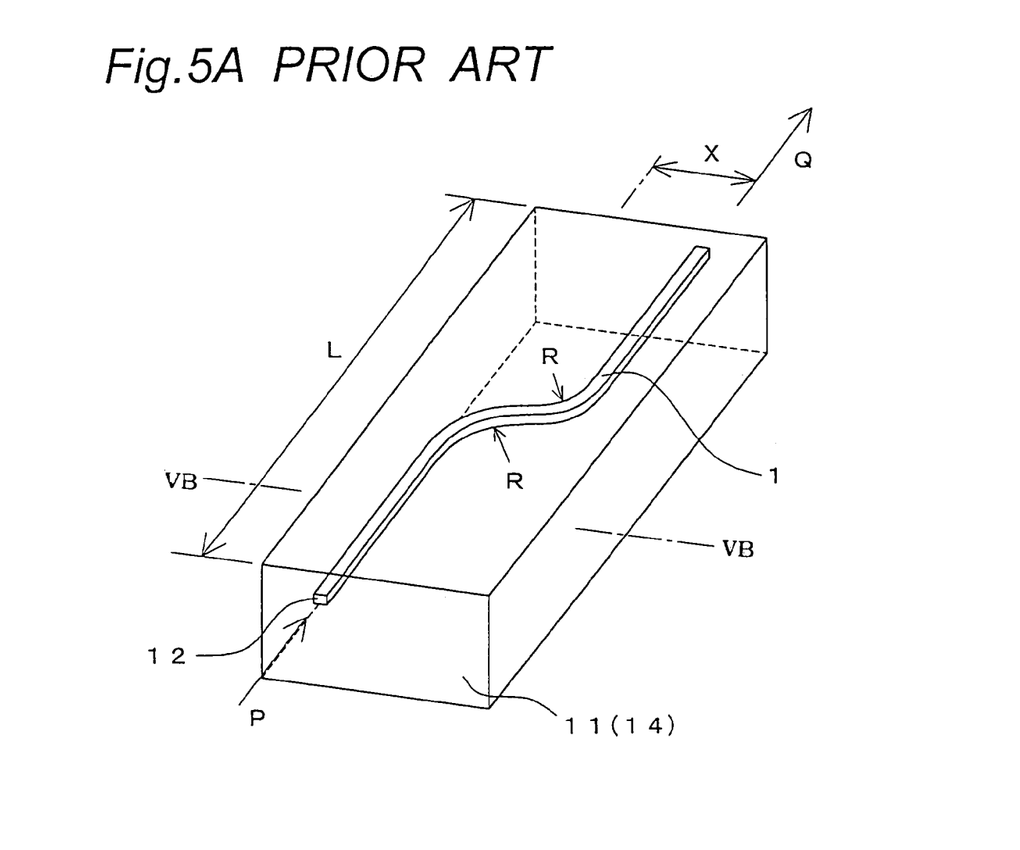
FIG. 5A is a perspective view schematically showing a conventional semiconductor optical device with a bent waveguide.
Figure 5B:
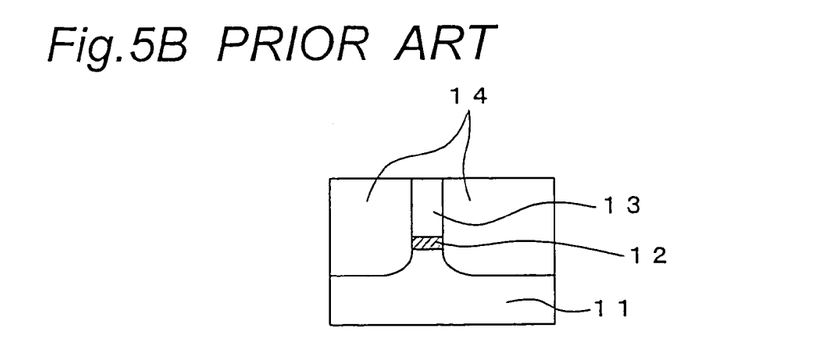
FIG. 5B is a sectional view along a cutting line VB—VB of FIG. 5A.

FIG. 5A is a perspective view schematically showing a conventional semiconductor optical device with an S-shaped bent waveguide. FIG. 5B is a sectional view along line VB—VB of FIG. 5A. In FIGS. 5A and 5B, reference numeral 1 represents an optical waveguide, 11 an n-type InP substrate of a semiconductor chip, 12 an InGaAsP core layer of the optical waveguide, 13 a p-type InP clad layer, and 14 a semi-insulating InP buried layer. Incident light coming from an input end P travels through the S-shaped bent waveguide and shifts in a lateral direction by a distance X and then it goes out from an output end Q. In such a bent waveguide structure, it is important to reduce optical loss caused by bending. The bending loss is drastically increased, as the radius of curvature of the bent portion of the waveguide becomes smaller than a specified value.

Figure 6:
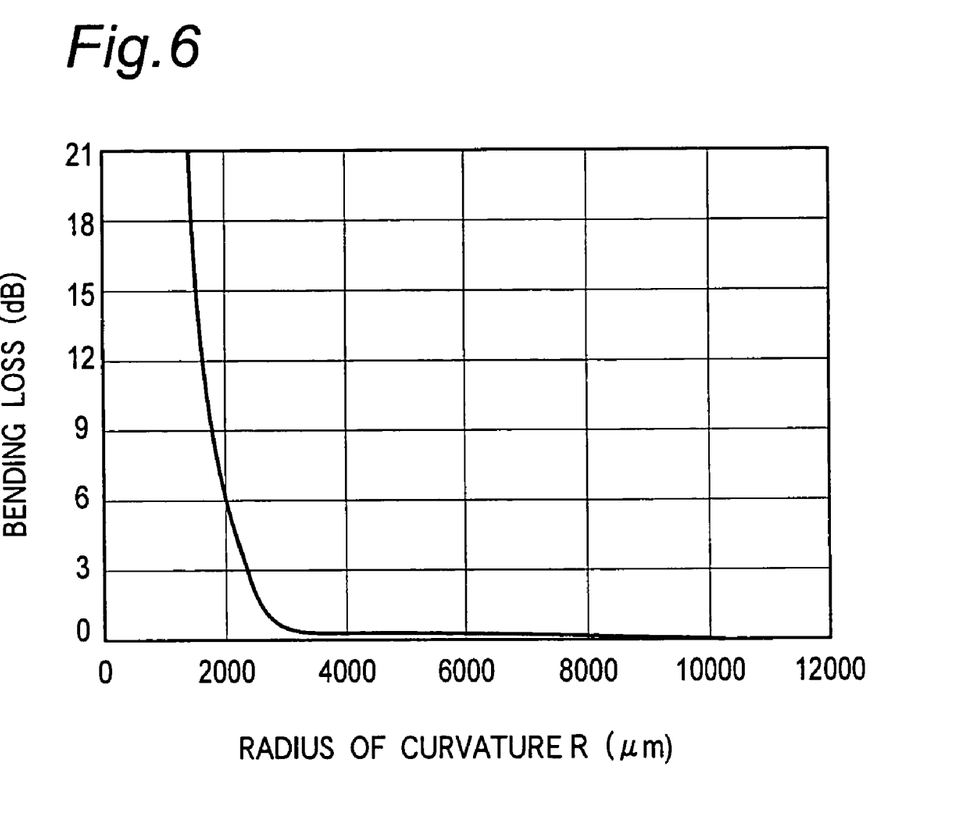
FIG. 6 is a graph showing a relationship between optical loss due to waveguide bending and radius of curvature of the bending.

FIG. 6 is a graph showing a relationship between the optical loss due to waveguide bending and the radius R of curvature of the bent portion. The relationship is calculated by the inventors according to a beam propagation method. The graph suggests that the radius of curvature should be 2400 $\mu$m or more for the reduction of the bending loss.

As another known application example of the conventional waveguide-type optical device with a high operation speed, small size and high efficiency, there has been suggested a waveguide type optical switch that includes multi-connected directional couplers, reflecting films each formed on a cleavage plane of one end of each directional coupler, and a plurality of optical waveguides formed by diffusing Ti substance in a form of stripes on a LiNbO$_3$ substrate as disclosed, for example, in a patent literature 1: Japanese Patent Laid-Open H3-256028 (1991), FIGS. 1 and 2.

In the conventional structure as shown in FIGS. 5A and 5B, however, the length L between the input and output ends of the waveguide is relatively long. More specifically, in the case of the semiconductor optical waveguide and letting the radius of curvature be a minimum of 2400 $\mu$m, the length L between the input and output ends of the waveguide for shifting the traveling light in a lateral direction by 200 $\mu$m can be given by a geometrical calculation according to formula 1 as follows:

$$L=2\times(R-X/2(N+1))\times\tan(a\,\cos((R-X)/2(N+1))/R)) \quad \text{(Formula 1)}$$

Substitution of X=200 $\mu$m, N=1 for the number of Y-branched part and R=2400 $\mu$m into formula 1 yields the length L=1371 $\mu$m, which is a relatively large size. This leads to a large size and a high cost of the semiconductor optical device. In order to reduce the device in size and cost, it is immediately necessary to reduce the length L between the input and output ends of the semiconductor optical waveguide while suppressing the bending loss.

On the contrary, in the structure as disclosed in the patent literature 1, the optical waveguides are formed by diffusing Ti substance in the form of stripes on the LiNbO$_3$ substrate having a light refraction index of 2 or less (about 1.5), where the multi-connected directional couplers are provided and each of the reflecting films is formed on the cleavage plane of one end of each directional coupler to thereby achieve the relatively short length L of the device. In such a structure, however, neither the substrate nor the optical waveguide is made of a semiconductor material, and therefore, the device has some difficulty in having a high operation speed or high integration with a small size, and the substrate also has a large size due to its relatively low refractive index.

SUMMARY OF THE INVENTION

The present invention has been developed to solve these problems. It is therefore an object of the invention to provide a semiconductor optical waveguide device in which the length between the input and output ends of the waveguide is short, in which the bending loss is small, and which can be integrated to have a high speed and a small size.

In order to achieve the object mentioned above, the present invention provides a semiconductor optical waveguide device which includes a semiconductor substrate and a plurality of substantially S-shaped bent waveguides embedded in the semiconductor substrate. In this construction, at least two optical waveguide returning parts are interposed between the input and output ends of the bent waveguides, and each of the optical waveguide returning parts includes a multiplexing portion. A reflecting part is formed on a rear end side of the multiplexing portion of each optical waveguide returning part, and is formed inside the semiconductor substrate.

In the above structure, each of the optical waveguide returning parts may be comprised of a Y-branch, an MMI coupler or a directional coupler.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DETAILED DESCRIPTION OF THE PREFERRED EMBODIMENTS

Before the description proceeds, it is to be noted that, since the basic structures of the preferred embodiments are in common, like parts are designated by the same reference numerals throughout the accompanying drawings and duplication of description will be avoided.

Referring to FIGS. 1 to 4, embodiments of the present invention are described in detail below. In the drawings, note that, for showing the optical waveguides, the parts embedded in the substrate are drawn in solid lines for easy understanding although they should be drawn in broken lines.

First Embodiment

Figure 1A:
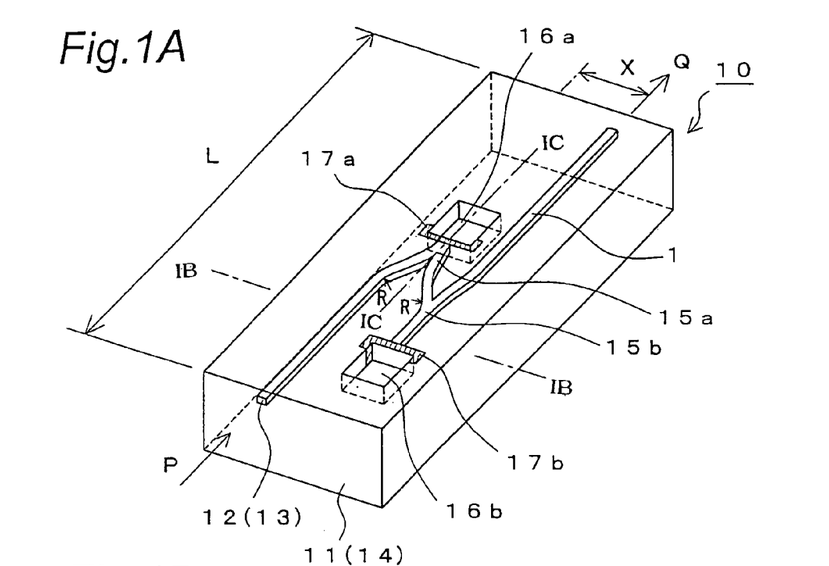
FIG. 1A is a perspective view schematically showing a semiconductor optical device having semiconductor optical waveguides according to a first embodiment of the invention.
Figure 1B:
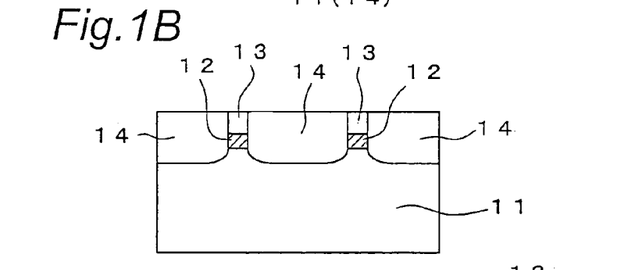
FIG. 1B is a sectional view along a line IB—IB of FIG. 1A.
Figure 1C:
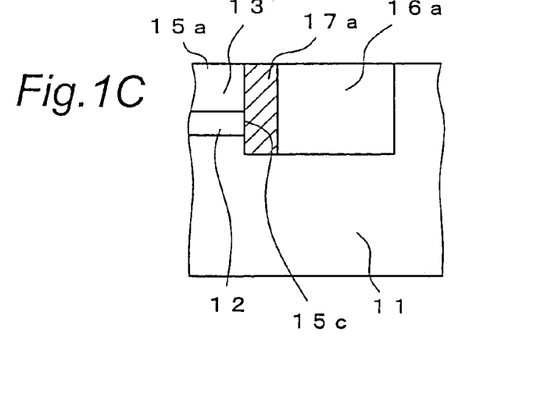
FIG. 1C is an enlarged sectional view showing a main part thereof along a line IC—IC of FIG. 1A.

A semiconductor optical waveguide device according to the first embodiment of the invention is described below referring to FIGS. 1A, 1B and 1C. In this embodiment, each optical waveguide returning part is comprised of a Y-branched optical waveguide (hereinafter, abbreviated as "Y-branched part" or "Y-branched coupler"). FIG. 1A is a perspective view schematically showing a structure of a semiconductor optical device 10 having semiconductor optical waveguides according to the first embodiment of the invention. FIG. 1B is a sectional view along a line IB—IB of FIG. 1A, and FIG. 1C is an enlarged sectional view showing a main part along a line IC—IC of FIG. 1A.

In the drawings, reference numeral 1 represents an optical waveguide, 11 an n-type InP substrate of a semiconductor chip, 12 an InGaAsP core layer of the optical waveguide, 13 a p-type InP clad layer, and 14 a semi-insulating InP buried layer. In this embodiment, as shown in FIG. 1B, the core layer 12 of the optical waveguide 1 is buried under the clad layer 13 at a certain depth level in the semi-insulating InP buried layer 14 of the semiconductor substrate 11.

Reference numerals 15a and 15b represent first and second Y-branched parts, respectively, and 16a and 16b represent first and second reflecting parts, respectively. Referring to FIG. 1C, a multiplexing end portion 15c of the Y-branched part 15a (also 15b) is polished to an optical mirror surface. Each reflecting part is formed at a position adjacent to the multiplexing end portion of each Y-branched part. The reflecting parts 16a and 16b are formed by dry-etching a prescribed portion of the semiconductor substrate 11 to have a rectangular bored recess.

A first reflecting film 17a is formed on one side of the reflecting part 16a, facing the end portion 15c of the Y-branched part 15a. Also, a second reflecting film 17b is formed in the same manner. For example, the reflecting films 17a and 17b are formed by vapor-depositing a metal film of aluminum or the like so as to have a high reflectivity of light. In this embodiment, the vapor-deposited metal film 17a (17b) formed on the end face of the reflecting part has a reflectance of 30% or more. Alternatively, the reflecting film may be made of any other metal material such as titanium, chromium, gold, platinum, and nickel.

Alternatively to the vapor-deposited metal film, the reflecting films 17a and 17b may be formed of an insulator film. Alternatively, the rectangular bored recess of each of the reflecting parts 16a and 16b may be filled with an insulating substance to form a reflecting surface.

In the above-described structure, incident light comes from an input end P, travels through three S-shaped bent waveguides, which are connected through two Y-branched parts 15a and 15b, and the light is shifted in a lateral direction by a distance X, and goes out from an output end Q.

Note that, as shown in the drawings, the embodiment as described above includes two Y-branched parts provided in the bent waveguides. However, three or more Y-branched parts may be provided to form a multistage reflection type structure.

For example, in the case where the distance X of lateral shift of light is 200 $\mu$m, the number N of the Y-branched parts is 2, and the radius of curvature R of each bent waveguide is 2400 $\mu$m in the structure as shown in FIG. 1(a), the length between the input and output ends of the waveguides is obtained as L=797 $\mu$m by substitution of X=200 $\mu$m, N=2 and R=2400 $\mu$m into the above formula 1, which is as small as 58% of the conventional length of L=1371 $\mu$m. In the structure as described above, two or more Y-branched parts are provided in the bent waveguides so as to reflect and return the incident light. According to such a structure, the light traveling direction can be shifted in a small sized semiconductor optical device.

According to the first embodiment, the device can be reduced in size and cost. The substrate and the optical waveguides are made of the semiconductor material, and therefore, the device can be integrated to obtain a high operation speed with a small size.

In the structure of the semiconductor optical waveguide device of the present invention, the thickness and the width of each optical waveguide are set so as to satisfy the cut-off condition of a higher-order mode at the used wavelength. In the first embodiment, the incident light is used in a wavelength band of 1.55 μm, so that the InGaAsP composition of the core layer 12 has a small optical absorption at the wavelength of the used light.

Second Embodiment

Figure 2:
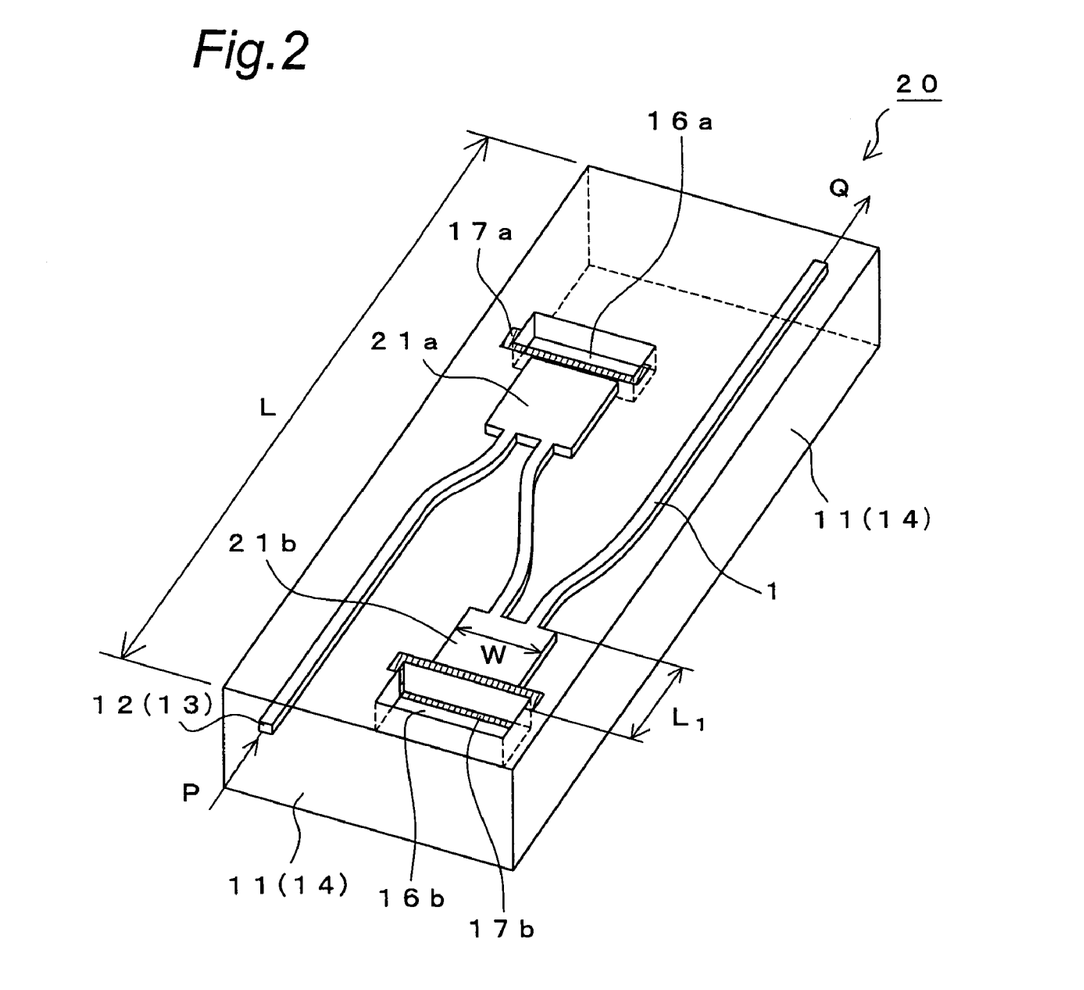
FIG. 2 is a perspective view schematically showing a structure of a semiconductor optical device having semiconductor optical waveguides according to a second embodiment of the invention.

Referring to FIG. 2, a semiconductor optical waveguide device according to the second embodiment of the invention is described below. In the first embodiment, the Y-branch is used as the means for returning the waveguide. In the second embodiment, a MMI (Multi-Mode Interference) coupler is used as the means for returning the waveguide.

FIG. 2 is a perspective view schematically showing a structure of a semiconductor optical device 20 having semiconductor optical waveguides according to the second embodiment of the invention. In FIG. 2, reference numerals 21a and 21b represent first and second MMI couplers, respectively. Reflecting parts 16a and 16b are formed adjacent to the end sides of the MMI couplers, at the opposite sides to the waveguides, respectively. On one side of the reflecting part 16a (16b) opposite and adjacent to the MMI coupler 21a (21b), reflecting film 17a (17b) is formed, for example, by vapor-depositing a metal film of aluminum or the like so as to have a high reflectivity of light.

For example, each MMI coupler may be configured as a rectangular waveguide having a width W of 6 μm and a length $L_1$ of 40 μm. Regarding the structure as shown in FIG. 2, a formula 2 is obtained as below based on the formula 1 for L, wherein N is the number of the MMI couplers.

$$L=L_1+2\times(R-X/2(N+1))\times\tan(a\ \cos((R-X)/2(N+1))/R))\quad\text{(Formula 2)}$$

Thus, the length between the input and output ends of the waveguides is obtained as L=837 μm by substitution of $L_1$=40 μm, X=200 μm, N=2, and R=2400 μm into the above formula 2, which is significantly smaller than the conventional length. Therefore, the device can be reduced in size and cost and be effective in a similar manner to the first embodiment. In the second embodiment, the incident light is used at a wavelength band of 1.55 μm, so that the InGaAsP composition of the core layer 12 has a small optical absorption at the used wavelength.

Third Embodiment

Figure 3A:
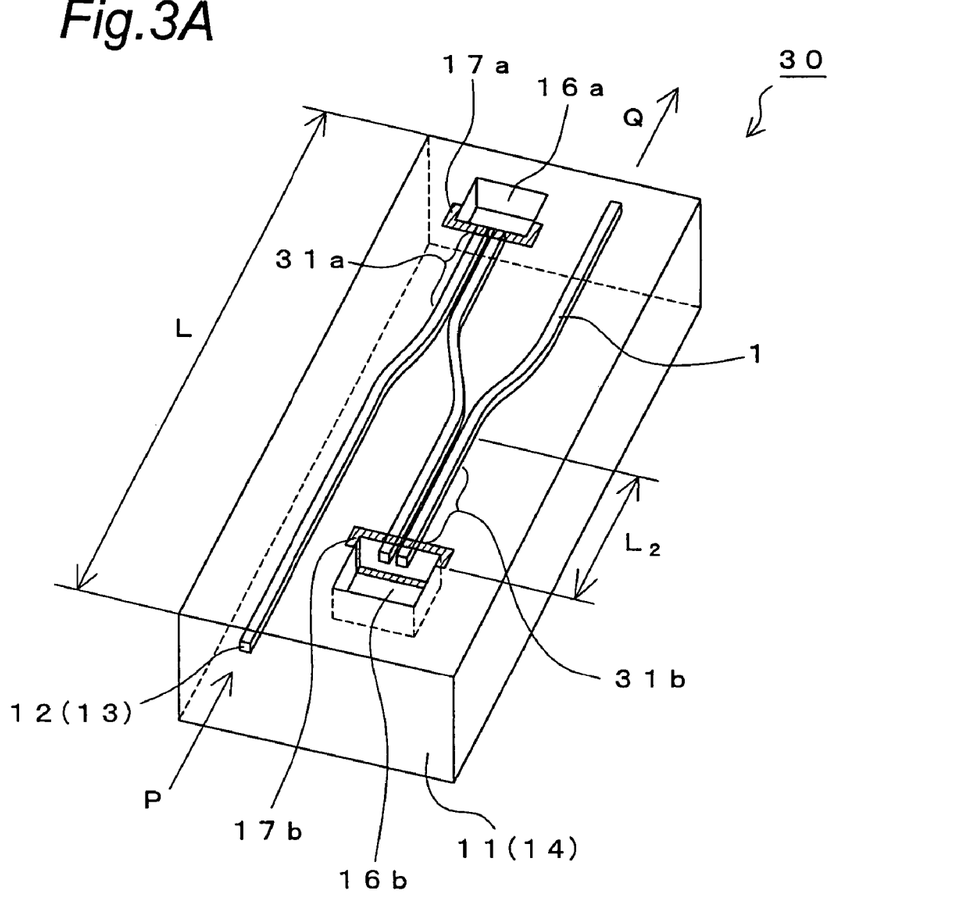
FIG. 3A is a perspective view schematically showing a structure of a semiconductor optical device having semiconductor optical waveguides according to a third embodiment of the invention.
Figure 3B:
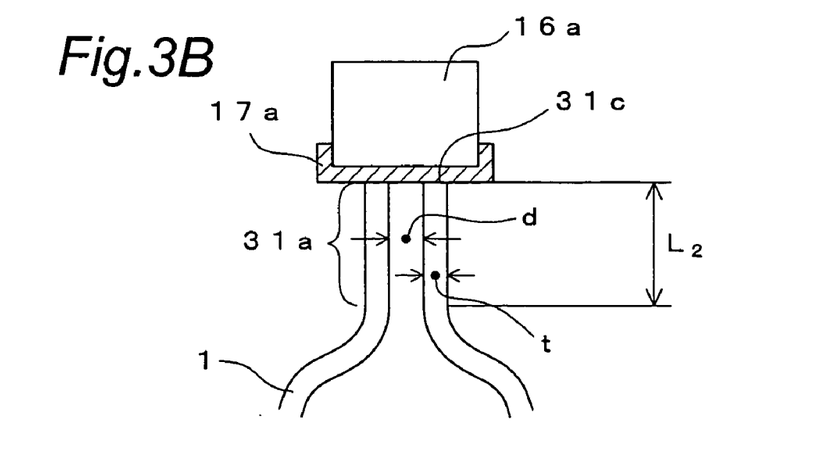
FIG. 3B is an enlarged top plan view showing a main part of the third embodiment.

Referring to FIGS. 3A and 3B, semiconductor optical waveguides according to the third embodiment of the invention are described below. In the first embodiment, although the Y-branch is used as the means for returning the waveguide, an optical directional coupler is used as the means for returning the waveguide in the third embodiment. In the first and second embodiments, there may occur an optical absorption loss because of a branching structure. In contrast, in the third embodiment, such a optical absorption loss can be avoided because of a structure having no branch end.

Specifically, FIG. 3A is a perspective view schematically showing a structure of a semiconductor optical device 30 having semiconductor optical waveguides according to the third embodiment of the invention. FIG. 3B is an enlarged top plan view showing a main part thereof. In FIGS. 3A and 3B, reference numerals 31a and 31b represent first and second optical directional couplers, respectively. Each of the optical directional couplers is constructed by arranging two optical waveguides in parallel and close to each other. Regarding the first optical directional coupler 31a, a reflecting part 16a is formed adjacent to the end side 31c of the optical directional coupler 31a in a similar manner to the first and second embodiments. On one side of the reflecting part 16a adjacent to the end side 31c of the optical directional coupler, a reflecting film 17a is formed. Also, regarding the second optical directional coupler 31b, a reflecting part 16b and a reflecting film 17b are formed in the same manner.

As shown in FIG. 3B, as a structural example of each optical directional coupler, each of the waveguides may have a width t of 1.5 μm and a length $L_2$ of 250 μm and the parallel waveguides are spaced by a distance d of 1 μm.

In the case of the semiconductor optical device 30 having the structure as shown in FIG. 3A, based on the formula 1, the length L of the device is calculated according to a formula 3 as below:

$$L=L_2+2\times(R-X/2(N+1))\times\tan(a\ \cos((R-X)/2(N+1))/R))\quad\text{(Formula 3)}$$

wherein N is the number of the optical directional couplers.

Thus, the length of the device is calculated as L=1047 μm by substitution of $L_2$=250 μm, X=200 μm, N=2, and R=2400 μm into the above formula 3, which the length L is as small as 76% of the conventional length.

According to this embodiment, therefore, the device can be reduced in size and cost and effective in a similar manner to the first embodiment. For example, if an InP semiconductor substrate having an index of light refraction of about 3.2 is used, the size of the substrate can be reduced about half of that of the conventional LiNbO$_3$ substrate having an index of light refraction of about 1.5, in any of the cases of using the Y-branched parts, the MMI couplers or the optical directional couplers. Note that, in this embodiment, the incident light having a wavelength band of 1.55 μm is used, so that the InGaAsP composition of the core layer 12 has a small optical absorption at the wavelength of the used light.

Fourth Embodiment

Figure 4A:
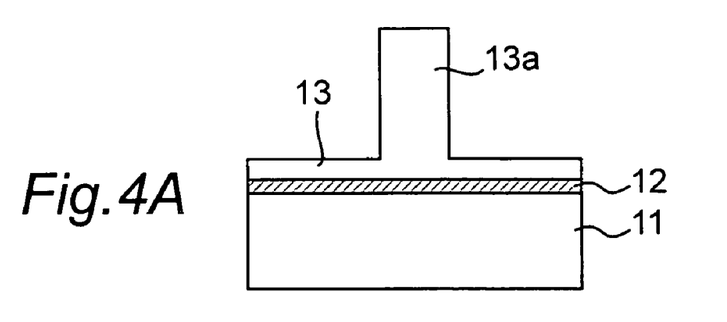
FIGS. 4A, 4B and 4C are sectional views showing modified examples of the semiconductor optical waveguide according to a fourth embodiment of the invention.
Figure 4B:
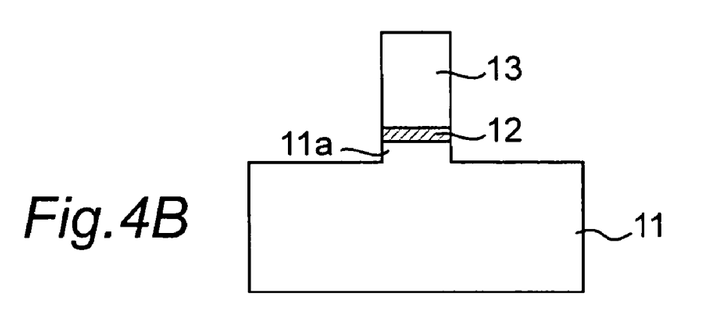
Figure 4C:
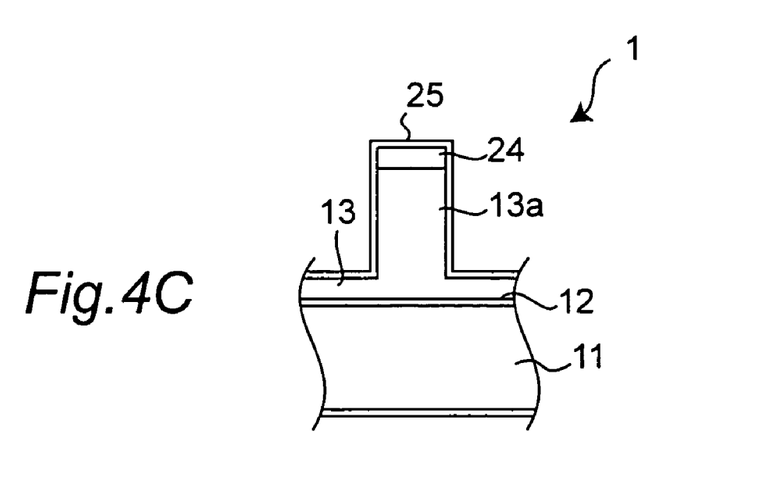

Referring to FIGS. 4A, 4B and 4C, a semiconductor optical waveguide according to the fourth embodiment of the invention is described below.

FIGS. 4A, 4B and 4C are sectional views showing modified examples 1 to 3 of the semiconductor optical waveguide according to the fourth embodiment of the invention. In the first to third embodiments, the core layer of each optical waveguide is buried under the clad layer. In contrast, in the fourth embodiment, a ridge-shaped optical waveguide (or elongated protrusion optical waveguide) is formed on the upper portion of the substrate as shown in the sectional views of FIGS. 4A, 4B and 4C.

In the modified example 1 as shown in FIG. 4A, an InGaAsP core layer 12 is formed on the upper surface of an n-type InP substrate 11. A p-type InP clad layer 13 is formed on the core layer 12, and a clad projection part 13a is formed at the center portion of the clad layer 13.

In the modified example 2 as shown in FIG. 4B, a projection part 11a is formed at the center portion of the upper surface of an n-type InP substrate 11. A core layer 12 is formed on the upper surface of the projection part 11a, and a clad layer 13 is formed thereon.

In the modified example 3 as shown in FIG. 4C, an InGaAsP core layer 12 is formed on an n-type InP substrate 11, a p-type InP clad layer 13 is formed on the core layer 12, and a clad projection part 13a is formed at the center portion of the clad layer 13 in a similar manner to the modified example 1. In this construction, the structure further includes a p-type InGaAsP contact layer 24 formed on the clad projection part 13a and an SiO$_2$ insulating film 25. The insulating film 25 is formed to cover the outer surfaces of the contact layer 24 and the clad layer 13. In this structure, the core layer 12 is formed at a certain depth level with respect to the clad layer 13 on the semiconductor chip substrate 11 including the lower region of the optical waveguide 1, and the upper part of the contact layer 24 is entirely covered with the SiO$_2$ insulating film 25.

Note that, in the modified examples 1 to 3, the incident light having a wavelength band of 1.55 μm is used, so that the InGaAsP composition of the core layer 12 has a small optical absorption at the wavelength of the used light.

In these sectional structures as shown above, the optical waveguides are monolithically integrated on a single substrate, and therefore, the semiconductor optical device can effectively be reduced in size and cost in a similar manner to the first to third embodiments.

As described above, according to the present invention, the chip substrate and the optical waveguides are made of semiconductor materials, and the optical waveguide returning parts are interposed between the waveguides and integrally connected thereto. Such a structure can be highly integrated to have a high operation speed with a small size and reduction in cost.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A semiconductor optical waveguide device, comprising:
   a semiconductor substrate;
   a plurality of substantially S-shaped bent waveguides embedded in the semiconductor substrate;
   at least two optical waveguide returning parts interposed between a light input end and a light output end of the bent waveguides, each of said optical waveguide returning parts including a multiplexing portion; and
   respective light reflecting parts on a rear end side of the multiplexing portion of each of the optical waveguide returning parts, inside the semiconductor substrate, wherein
   the rear end side of the multiplexing portion has an optical mirror surface, and
   each of the light reflecting parts includes a rectangular recess in the semiconductor substrate and a reflecting film on a side surface of the rectangular recess, facing the rear end side of the multiplexing portion.

2. The semiconductor optical waveguide device according to claim 1, wherein each of the optical waveguide returning parts comprises a Y-branch.

3. The semiconductor optical waveguide device according to claim 1, wherein each of the optical waveguide returning parts comprises a multi mode interference coupler.

4. The semiconductor optical waveguide device according to claim 1, wherein each of the optical waveguide returning parts comprises a directional coupler.

5. The semiconductor optical waveguide device according to claim 1, wherein the optical waveguide returning parts and the light reflecting parts are located at a predetermined depth within the rectangular recess in the semiconductor substrate.

6. The semiconductor optical waveguide device according to claim 1, wherein each of the bent waveguides includes a core layer and a cladding layer, the core layer being InGaAsP, and the cladding layer being InP, wherein incident light, at a wavelength band of 1.55 μm, is applied to the optical waveguide device and the bent waveguides have a radius of curvature of at least 2400 μm.

7. The semiconductor optical waveguide device according to claim 1, including a vapor-deposited metal film having a reflectance of at least 30% on an end surface of each of the light reflecting parts.

8. The semiconductor optical waveguide device according to claim 7, wherein the metal film is aluminum.

9. The semiconductor optical waveguide device according to claim 1, wherein
   each of the light reflecting parts is a dry-etched portion of the semiconductor substrate, and
   the rectangular recess is filled with an insulating substance forming a reflecting surface.

* * * * *